(12) United States Patent
Posch et al.

(10) Patent No.: US 8,963,047 B2
(45) Date of Patent: Feb. 24, 2015

(54) CORED WIRE ELECTRODE

(75) Inventors: Gerhard Posch, Freienstein (AT); Guenter Moitzi, Kobenz (AT); Michael Fiedler, Passail (AT); Franz Rotter, Mondsee (AT); Walter Berger, Graz (AT)

(73) Assignee: Boehler Schweisstechnik Austria GmbH, Kapfenberg (AT)

( * ) Notice: Subject to any disclaimer, the term of this patent is extended or adjusted under 35 U.S.C. 154(b) by 659 days.

(21) Appl. No.: 13/255,788
(22) PCT Filed: Mar. 8, 2010
(86) PCT No.: PCT/AT2010/000070
§ 371 (c)(1),
(2), (4) Date: Nov. 28, 2011
(87) PCT Pub. No.: WO2010/102318
PCT Pub. Date: Sep. 16, 2010

(65) Prior Publication Data
US 2012/0061354 A1 Mar. 15, 2012

(30) Foreign Application Priority Data
Mar. 11, 2009 (AT) .................. A 393/2009

(51) Int. Cl.
B23K 35/02 (2006.01)
B23K 35/40 (2006.01)
B23K 9/24 (2006.01)
B23K 35/30 (2006.01)
B23K 35/36 (2006.01)

(52) U.S. Cl.
CPC ............. *B23K 9/24* (2013.01); *B23K 2035/408* (2013.01); *B23K 35/0227* (2013.01); *B23K 35/0244* (2013.01); *B23K 35/0261* (2013.01); *B23K 35/0266* (2013.01); *B23K 35/3053* (2013.01); *B23K 35/3602* (2013.01); *B23K 35/3605* (2013.01); *B23K 35/406* (2013.01); *B23K 2203/04* (2013.01)
USPC .................. 219/145.22; 219/145.41

(58) Field of Classification Search
CPC ........ B23K 26/00; B23K 26/20; B23K 35/00; B23K 35/02; B23K 35/40; B23K 2035/408
USPC ................. 219/121.66, 145.1–147, 219/121.13–121.15, 121.63, 121.64
See application file for complete search history.

(56) References Cited

U.S. PATENT DOCUMENTS 3,318,729 A   5/1967   Siegle et al.
6,054,667 A   4/2000   Bonnet et al.
(Continued)

FOREIGN PATENT DOCUMENTS

DE   601 30 958   7/2008
EP   1207002      5/2002
(Continued)

OTHER PUBLICATIONS

Austrian Office Action conducted in counterpart Austrian Appln. No. A 393/2009 (Dec. 9, 2009) (with partial English language translation).

*Primary Examiner* — Samuel M Heinrich
(74) *Attorney, Agent, or Firm* — Greenblum & Bernstein, P.L.C.

(57) ABSTRACT

The invention relates to a tubular cored electrode for producing a high-strength fusion-welded connection and relates to a method for producing tubular cored electrodes with a diameter of less than 2 mm. In order to avoid an oxidation and water absorption of the filler flux and to retain the original thermal reaction potentials of the mineral constituents thereof, according to the invention the tubular cored electrode is characterized in that the cold formed metal tube has in the longitudinal direction a tight fusion welded connection or a weld seam, which has a smaller weld penetration than corresponds to the tube wall thickness and in this manner a spacing of the metal bond of the tube wall towards the flux core is formed.

19 Claims, 3 Drawing Sheets

(56) References Cited

U.S. PATENT DOCUMENTS

| | | |
|---|---|---|
| 2004/0169026 A1 | 9/2004 | Chen et al. |
| 2005/0045612 A1 | 3/2005 | Chen et al. |
| 2007/0193228 A1 | 8/2007 | Astier et al. |
| 2009/0241336 A1* | 10/2009 | Karnes et al. .................. 29/868 |

FOREIGN PATENT DOCUMENTS

| | | |
|---|---|---|
| EP | 1820599 | 8/2007 |
| FR | 2766399 | 1/1999 |
| GB | 1199736 | 7/1970 |
| JP | 56-148494 | 11/1981 |

\* cited by examiner

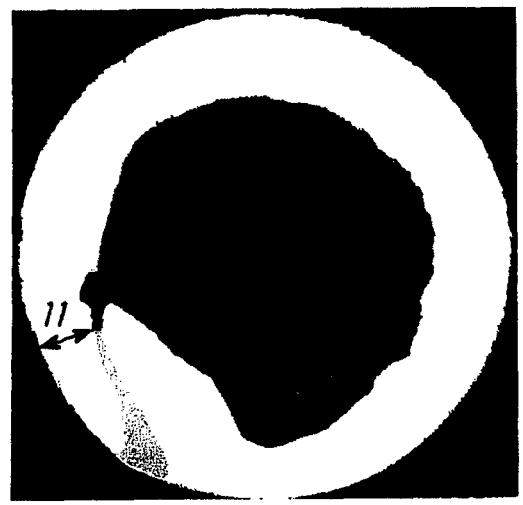
_Fig. 4_
_Fig. 5_
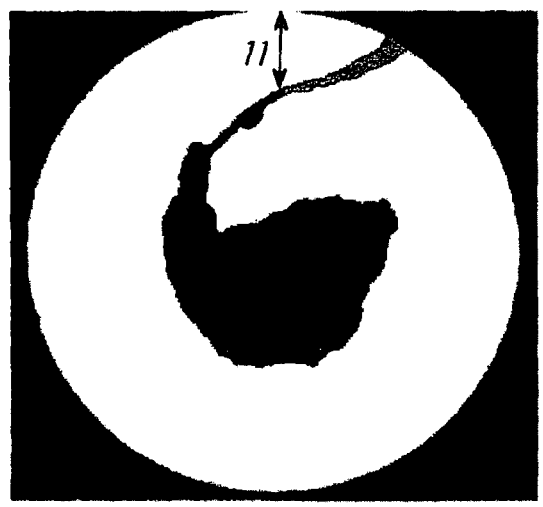
_Fig. 6_

CORED WIRE ELECTRODE

CROSS-REFERENCE TO RELATED APPLICATIONS

The present application is a U.S. National Stage of International Patent Application No. PCT/AT2010/000070 filed Mar. 8, 2010, and claims priority under 35 U.S.C. §119 and 365 of Austrian Patent Application No. A 393/2009 filed Mar. 11, 2009. Moreover, the disclosure of International Patent Application No. PCT/AT2010/000070 is expressly incorporated by reference herein in its entirety.

BACKGROUND OF THE INVENTION

1. Field of the Invention

The invention relates to a tubular cored electrode for producing a fusion-welded connection of parts of high-strength steels with a minimum yield point ($RP_{0.2}$) of the weld metal of 690 N/mm², comprising a metal tube with an outer diameter of less than 2 mm, which surrounds a filler flux core and optionally bears a coating.

Furthermore, the invention relates to a method for the essentially continuous production of tubular cored electrodes with a diameter of less than 2 mm, for the production of a fusion-welded connection of parts of high-strength steels with a minimum yield point ($RP_{0.2}$) of the weld metal of 690 N/mm² essentially with a production sequence: provision of a metal strip, forming of the metal strip in the longitudinal direction to form an essentially U-shape in cross section, insertion of filler flux into the U-shaped strip, reshaping the strip to form a tube with a joint of lateral faces bearing against one another and a filler wire flux core, connection of the joint by welding, deformation of the cross section and optionally coating of the surface of the tube or of the electrode.

2. Discussion of Background Information

Tubular cored electrodes are used for connecting parts by fusion welding as a welding filler material. In a welding device, the electrode wire is removed from a stock, for example a wire reel, and the wire is discharged from a feed or conveyor, to a so-called welding head, for an arc fusion welding, in which the electric energy supply to the electrode also takes place.

The welding head can be hand-guided or moved mechanically, whereby an automatic welding can optionally take place up to the use of computer-controlled welding robots.

A tubular cored electrode is a tubular electrode and contains inside chiefly mineral constituents and/or deoxidants and/or metallic constituents, in particular for alloying the welding melt. The composition of the filler flux core is carefully selected and the constituents should thereby be present in a form that at least does not negatively affect the welding process as well as guaranteeing a high weld seam quality.

For a supply of the welding energy to the tubular cored electrode, a bare metal surface of the same is necessary. The electrode surface is frequently copper-plated for better conducting of the current, which in addition results in a prevention of oxidation.

To avoid the formation of pores and/or cracks in the weld metal, it is important to keep the moisture content as low as possible, particularly in the filler powder of the electrode, so that a hydrogen absorption by the molten welding filler material is largely avoided during the arc welding.

In order to avoid an absorption of moisture by the filler flux during the storage of the electrode, essentially two production variants are available according to the prior art.

With one method of production of a tubular cored electrode, filler flux is inserted as homogenously as possible into a tight tube, the tube end sides are closed and the primary material thus provided is rolled to form wire and/or subjected to a tensile strain. A high strain-hardening of the tube wall in the course of the deformation can be overcome by annealing treatments of the intermediate product.

A further known production method for tubular cored electrode primary material lies in shaping a metal strip to form a U-shaped cross-sectional form, filling the U-shape with filler flux with subsequent reshaping to form a tube and an inductive welding of the axial joint surfaces. A primary material of this type with an outside diameter of 30 mm, for example, as mentioned above, can be further shaped to form a filler wire, optionally with an intermediate annealing treatment for initial strengthening of the tube material.

The methods according to the prior art have the disadvantage in common that at least in part the filler flux is heated to high temperatures at which decomposition and/or oxidation reactions of the flux constituents can occur.

Another disadvantage can be given in that during the welding process, before welding on the electrode, the metallic surface thereof is oxidized and oxygen is thus incorporated into the molten metal of the weld seam.

SUMMARY OF THE EMBODIMENTS

Embodiments of the invention create a tubular cored electrode of the type mentioned at the outset, which is formed by a tube welded in an air-tight manner to avoid oxidation and water absorption by the filler flux core. At least the mineral constituents in the filler flux have their original thermal reaction potentials. The outer surface of the electrode is to thereby ensure an essentially unhindered supply of the welding current.

Furthermore, embodiments of the invention are directed to a generic method that includes a tubular cored electrode with an air-tight welding of the joint of a sheet-metal strip being curved to form a tube and the filler flux is thereby kept essentially free of heating.

Embodiments of the invention include that the cold formed metal tube has a tight fusion-welded connection or a weld seam in the longitudinal direction, which has a smaller weld penetration than corresponds to the tube wall thickness and in this manner a spacing of the metallic bond of the tube wall to the flux core is formed.

The advantages achieved with the tubular cored electrode according to the invention are essentially provided by the cold forming of the metal tube and the tightness of the weld seam free from added materials and with a small weld penetration. It is ensured in this manner that an oxidation of metallic constituents of the filler flux as well as an entry of moisture therein is prevented, and the thermal reaction potentials of the respective mineral components are preserved individually and in combination so that a release of reagents and/or of gases, e.g., fluorides, to bind the hydrogen and a connection formation, for example, for flux formation for the weld seam formation advantageously take place only in the electric arc.

According to embodiments and, with respect to a secure and crack-free joint connection of the primary material and the subsequent cold forming, it is advantageous if the metallic bond of the tube wall is less than 0.3 to 0.9, preferably less than 0.5 to 0.8 times the tube wall thickness.

In a favorable manner, the area proportion of the filler flux core is less than 60% but more than 10%, preferably less than 45% but more than 12%, based on the total cross section of the electrode. The welding properties of the electrode as well as the alloy formation can be optimized thereby with respect to a melting of the welding consumable.

If the flux core of the tubular cored electrode is composed of slag-forming agents, in particular fluorides, carbonates, oxides and/or the like of metal flux, in particular alloying powder, of deoxidants, in particular aluminum, silicon, magnesium, manganese, zirconium and the like and compounds of these elements, including microalloying agents, during the fusing of the same in the electric arc a liquid, homogenous, deoxidized melt purified by the slag reactions with a low hydrogen content and flow slag are formed, which ultimately serves to at least partially cover the liquid phase. During a fusing of the essentially anhydrous constituents, in particular the mineral constituents of the flux core, gaseous reaction products are also released, which have a shielding gas effect and a further degassing effect of the liquid metal.

It can be advantageous for a shielding gas development directly before a fusing of the tubular cored electrode during welding as well as for ensuring the passage of current if the metal tube has a coating. This coating can also be used as protection against an oxidation of the electrode surface.

A particular advantage is provided according to the invention when the coating is composed of fluorocarbon polymers, optionally PTFE (polytetrafluoroethylene) and carbon, preferably in a ratio of 1:2 to 1:4. PTFE thereby causes the formation of shielding gas and hydrogen bond, wherein the carbon ensures the passage of current into the tube body. Smaller ratio values than 0.5 impair an introduction of the welding current, which can lead to a premature heating of the tube body and to an overload of the current introduction means. In the case of values lower than 0.25, the carbon can cause alloying problems.

Advantageously, the tubular cored electrode is structured such that the weld metal made therefrom has a concentration of the main alloying elements of in % by weight of carbon traces to 0.2, silicon traces to 1.0, manganese 0.1 to 2.0, chromium 0.01 to 0.5, nickel 0.01 to 3.0, molybdenum 0.001 to 1.0 as well as optionally special alloying additions in total up to 0.5, the rest being iron and contaminant elements.

A weld metal alloy of this type is a high-strength, fine grained iron-base material with a yield strength $RP_{0.2}$ of considerably more than 690 $Nmm^2$.

Further embodiments of the invention are directed to a method of the type mentioned at the outset that includes a filler flux mixed from essentially anhydrous raw materials inserted into the strip curved to a U-shape in cross section. Subsequently, the lateral regions of the strip are further formed into a tube, and then the joint of the lateral faces of the tube bearing against one another in the longitudinal direction are connected by beam welding free from welding additives, such as laser beam welding or electron beam welding. The weld penetration or the metallic bond produced by melting the tube wall is smaller in the direction towards the flux core than the thickness of the tube wall, and that a tubular cored electrode is produced by cold forming from the tube produced in this manner.

The advantages in terms of process engineering lie mainly in a use of essentially anhydrous raw materials while obtaining a full thermal reaction potential, in particular of mineral components, and in the selection of the welding flux and the welding technology oriented towards a tight metallic bond that is desired to be provided at the joint of the electrode primary material, which is subsequently further processed by means of cold forming. A beam welding free from additives provides a relatively high-quality partial melting of the joint even with high welding powers, measured in weld seam length per time unit, which fusion does not show any crack formation and tendency to breakage of the strengthened material at all even at high cold forming degrees. Because according to the invention the welding is now carried out only on the outer part of the lateral faces of the tube, in the interior region thereof there is no thermal stress of the filler flux. In this manner, the thermal reaction potential of at least some flux components is retained and the metal flux part does not oxidize.

It is particularly advantageous and essential for the invention for producing a seam of the desired type on the tube if the joint welding of the faces of the joint bearing against one another is carried out with a weld penetration depth of 0.3 and less to 0.9, preferably 0.5 and less to 0.8 times the tube wall thickness.

The highest precision and safety of the welding of the outer part of the joint with high welding power or welding rate can be achieved in terms of process engineering if the welding beam, formed as a laser beam or electron beam, is directed at the joint of the lateral faces of the tube at an angle between 5° and 45°, preferably 10° to 30° to the tube axis.

Advantages in terms of process engineering as well as economic advantages can be achieved if the joint of the tube is welded tight at a rate of over 40 m/min, preferably over 65 m/min.

The producibility as well as the welding properties can be optimized if the tube connected by welding is coated and further formed by cold forming to form a tubular cored electrode.

The invention is explained in more detail based on representations that convey only ways of carrying out the invention.

BRIEF DESCRIPTION OF THE DRAWINGS

They show:
FIGS. 2 through 7 illustrate enlarged views of a cross section of a tubular cored electrode.

DETAILED DESCRIPTION OF THE EMBODIMENTS

Figure 1:
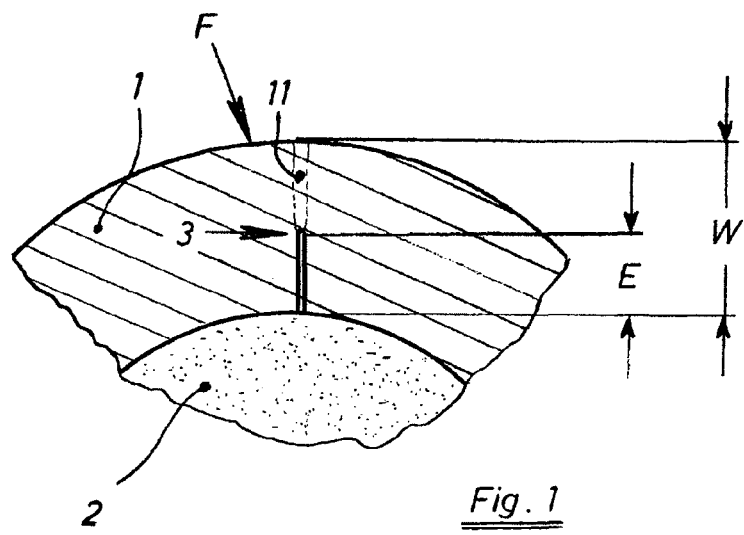
FIG. 1 diagrammatically illustrates a welded tube wall.

FIG. 1 shows a connection region of a primary material F before a cold forming to produce a tubular cored electrode in cross section. A joint 3 of lateral faces of a shaped tube 1 bearing against one another is connected metallically on the outside by fusion welding 11. The interior part E of the tube wall with a thickness W does not have a connection produced by fluxing the tube material towards the flux core 2.

FIGS. 2 through 7 show tubular cored electrodes with diameters of in each case 1.2 mm.

A primary material with a diameter of 4.0 mm was produced from an unalloyed steel strip, for example, with a width of 12 mm and a thickness of 0.8 mm, wherein after a shaping to form a U-strip in cross section, an insertion of filler flux thereinto with subsequent shaping of a tube took place. A joint of lateral faces bearing against one another formed in the course of shaping the tube was welded at a welding rate of 60 m/min throughput with laser technology such that approximately 50% of the joint has a metallic fusion connection. In tests good results were recorded with respect to the quality of the fusion welding connection desired in limits and an economic production at a welding rate of over 40 m/min to 100 m/min and more, wherein an angle of the welding beam of a laser device to the tube axis in the range of 5° to 45°, with an optimum of approx. 20°, provided good welded joints.

A cold forming of the primary material was carried out in the usual way by idle rolls and/or driven rolls and/or wire-drawing dies to form a filler wire.

Figure 2:
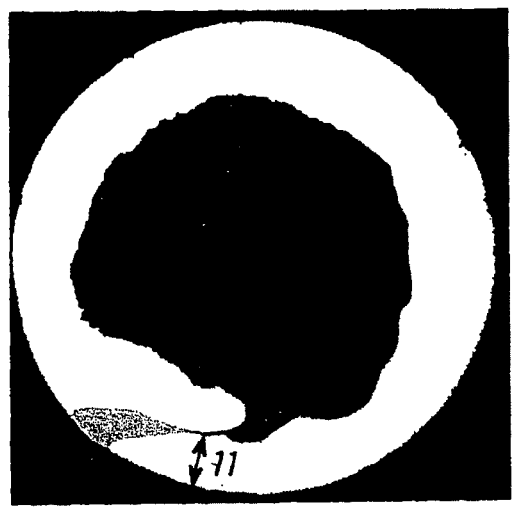
Figure 3:
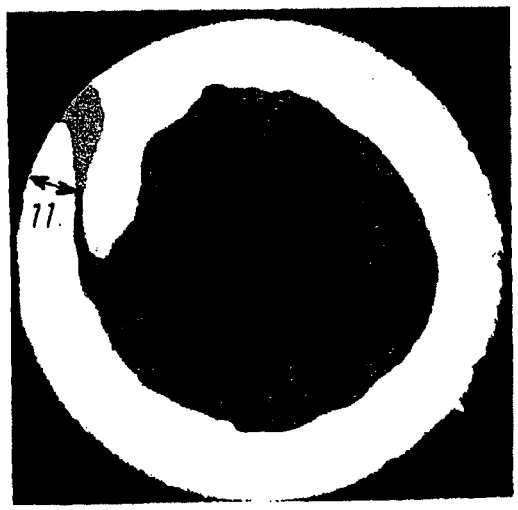

FIGS. 2 through 4 show cross sections of filler wire with a filler flux proportion of 47% residual tube proportion based on the cross-sectional area.

Figure 7:
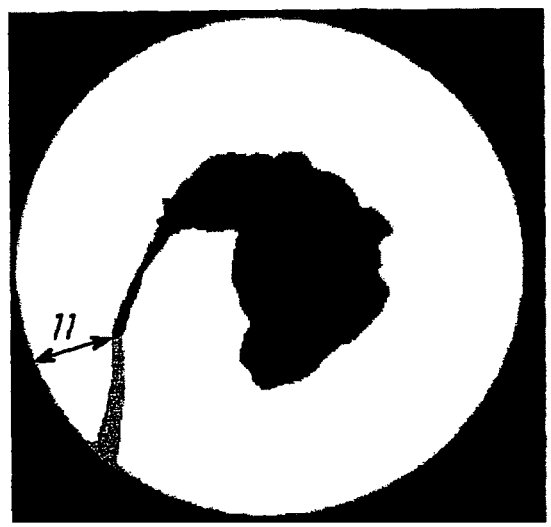

FIGS. 5 through 7 show the cross sections of the tubular cored electrodes which have a flux part of 18% residual surface tube wall part.

For the tests, the liquid metal formed during welding was doped to make distinguishing easier.

All of the images of tubular cored electrodes show a deformed weld region, wherein the metallic bond 11 is distanced from the flux core.

The invention claimed is:

1. A tubular cored electrode structured for producing fusing welded connection of parts of high-strength steels with a minimum yield point (RP0.2) of the weld metal of 690 N/mm2, comprising:
   a filler flux core;
   a metal tube with an outer coating and an outer diameter of less than 2 mm, which is cold formed to surround the filler flux core; and
   a metallic bond weld of the metal tube forms one of a tight fusion welded connection or a weld seam and extends in a longitudinal direction and has a weld penetration depth of less than 0.3 to 0.9 times a wall thickness of the metal tube to form a spacing between the welded connection or weld seam of the tube wall to the flux core,
   wherein the flux core comprises at least one of slag-forming agents and metal flux, including micro-alloying agents, and
   wherein the outer coating comprises a fluorocarbon polymer including polytetrafluoroethylene (PTFE) and carbon.

2. The tubular cored electrode according to claim 1, wherein the metallic bond is less than 0.5 to 0.8 times the tube wall thickness.

3. The tubular cored electrode according to claim 1, wherein an area proportion of the filler flux core to the total cross section of the metal tube is less than 60% but more than 10%.

4. The tubular cored electrode according to claim 3, wherein an area proportion of the filler flux core to the total cross section of the metal tube is less than 45% but more than 12%.

5. The tubular cored electrode according to claim 1, wherein the slag-forming agents comprise at least one of fluorides, carbonates, oxides and/or the like the metal flux comprises alloying powder.

6. The tubular cored electrode according to claim 1, wherein the flux core further comprises deoxidants including at least one of aluminum, silicon, magnesium, manganese, zirconium and the like and compounds of these elements.

7. The tubular cored electrode according to claim 1, wherein the fluorocarbon polymer comprises polytetrafluoroethylene (PTFE) and carbon in a ratio of 1:2 to 1:4.

8. The tubular cored electrode according to claim 1, wherein the metallic bond has a concentration of the main alloying elements of in % by weight of carbon traces to 0.2, silicon traces to 1.0, manganese 0.1 to 2.0, chromium 0.01 to 0.5, nickel 0.01 to 3.0, molybdenum 0.001 to 1.0, the rest being iron and contaminant elements.

9. The tubular cored electrode according to claim 8, wherein the metallic bond further includes special alloying additions in total up to 0.5% by weight.

10. A method for an essentially continuous production of tubular cored electrodes with a diameter of less than 2 mm that are structured for the production of a fusion-welded connection of parts of high-strength steels with a minimum yield point (RP0.2) of the weld metal of 690 N/mm2, the method comprising:
    providing a metal strip;
    forming the metal strip in a longitudinal direction into an essentially U-shape cross section;
    mixing a filler flux comprising at least one of slag forming agents and a metal flux, including microalloying agents, from essentially anhydrous raw materials;
    inserting the filler flux into the U-shaped strip;
    reshaping the strip by cold forming a tube with a filler wire flux core, whereby lateral faces of the strip are arranged to bear against one another to form a joint;
    connecting the joint by beam welding free from welding additives to form a metallic bond in the joint having a penetration depth in a direction toward the filler flux core that is less than 0.3 to 0.9 times the wall thickness of the tube, the welding free from welding additives comprising one of laser beam welding or electron beam welding; and
    coating a surface of the tube with a fluorocarbon polymer including polytetrafluoroethylene and carbon.

11. The method according to claim 10, wherein the penetration depth of the metallic bond is less than 0.5 and to 0.8 times the tube wall thickness.

12. The method according to claim 10, wherein a welding beam directed at the joint is oriented at an angle between 5° and 45° to a tube axis.

13. The method according to claim 12, wherein the welding beam is oriented at an angle of 10° to 30° to the tube axis.

14. The method according to claim 10, wherein the joint welded at a rate of over 40 m/min.

15. The method according to claim 14, wherein the joint is welded at a rate of over 65 m/min.

16. The method according to claim 10, wherein the slag-forming agents comprise at least one of fluorides, carbonates, oxides and/or the like and the metal flux comprises alloying powder.

17. The method according to claim 10, wherein the flux core further comprises a deoxiding agent including at least one of aluminum, silicon, magnesium, manganese, zirconium and the like and compounds of these elements.

18. The method according to claim 10, wherein the fluorocarbon polymer comprises polytetrafluoroethylene (PTFE) and carbon in a ratio of 1:2 to 1:4.

19. A tubular cored electrode structured for producing fusing welded connection of parts of high-strength steels with a minimum yield point (RP0.2) of the weld metal of 690 N/mm2, comprising:
    a filler flux core;
    a metal tube with an outer coating and an outer diameter of less than 2 mm, which is cold formed to surround the filler flux core;
    a metallic bond weld of the metal tube forms one of a tight fusion welded connection or a weld seam and extends in a longitudinal direction and has a weld penetration depth of less than 0.3 to 0.9 times a wall thickness of the metal tube to form a spacing between the welded connection or weld seam of the tube wall to the flux core,
    wherein the flux core comprises slag-forming agents, including at least one of fluorides, carbonates, oxides and/or the like, metal flux, including alloying powder, and deoxidants, including at least one of aluminum, silicon, magnesium, manganese, zirconium and the like and compounds of these elements, including microalloying agents, and wherein the outer coating comprises a fluorocarbon polymer including polytetrafluoroethylene (PTFE) and carbon in a ratio of 1:2 to 1:4.

* * * * *